United States Patent
Murakami et al.

(10) Patent No.: US 9,935,419 B2
(45) Date of Patent: Apr. 3, 2018

(54) OPTICAL FIBER DEVICE

(71) Applicants: Mitsuboshi Diamond Industrial Co., LTD., Settsu, Osaka (JP); OSAKA UNIVERSITY, Suita-shi, Osaka (JP)

(72) Inventors: Masanao Murakami, Settsu (JP); Christian Schaefer, Settsu (JP); Satoshi Hattori, Settsu (JP); Takahisa Hayashi, Settsu (JP); Seiji Shimizu, Settsu (JP); Shigeki Tokita, Suita (JP)

(73) Assignees: MITSUBOSHI DIAMOND INDUSTRIAL CO., LTD., Osaka (JP); OSAKA UNIVERSITY, Osaka (JP)

( * ) Notice: Subject to any disclaimer, the term of this patent is extended or adjusted under 35 U.S.C. 154(b) by 0 days.

(21) Appl. No.: 15/506,248

(22) PCT Filed: Jul. 24, 2015

(86) PCT No.: PCT/JP2015/071115
§ 371 (c)(1),
(2) Date: Feb. 24, 2017

(87) PCT Pub. No.: WO2016/031458
PCT Pub. Date: Mar. 3, 2016

(65) Prior Publication Data
US 2017/0256903 A1 Sep. 7, 2017

(30) Foreign Application Priority Data
Aug. 27, 2014 (JP) .................................. 2014-172809

(51) Int. Cl.
H01S 3/30 (2006.01)
H01S 3/094 (2006.01)
(Continued)

(52) U.S. Cl.
CPC ...... *H01S 3/094019* (2013.01); *H01S 3/0405* (2013.01); *H01S 3/06704* (2013.01);
(Continued)

(58) Field of Classification Search
CPC ............... H01S 3/0405; H01S 3/06704; H01S 3/06733; H01S 3/08059; H01S 3/094007;
(Continued)

(56) References Cited

U.S. PATENT DOCUMENTS 4,815,079 A 3/1989 Snitzer et al.
5,317,585 A 5/1994 Gregor
(Continued)

FOREIGN PATENT DOCUMENTS

JP H01-260405 A 10/1989
JP H07-297467 A 11/1995
(Continued)

OTHER PUBLICATIONS

The Search Report from the corresponding International Patent Application No. PCT/JP2015/071115 dated Oct. 6, 2015.

*Primary Examiner* — Kinam Park
(74) *Attorney, Agent, or Firm* — Shinjyu Global IP

(57) ABSTRACT

In an optical fiber device having a configuration in which an optical fiber is joined to a side surface of another optical fiber, a joint portion is suppressed from reaching a high temperature. The optical fiber device includes a first fluoride fiber, a second fluoride fiber, and a heat dissipation member. The first fluoride fiber guides light. The second fluoride fiber has a first end on or from which light is incident or output and a second end at which an end surface of the second fluoride fiber is obliquely joined to a side surface of the first fluoride fiber.

10 Claims, 3 Drawing Sheets

(51) Int. Cl.
  *H01S 3/04* (2006.01)
  *H01S 3/067* (2006.01)
  *H01S 3/0941* (2006.01)

(52) U.S. Cl.
  CPC ........ *H01S 3/06733* (2013.01); *H01S 3/0941* (2013.01); *H01S 3/094007* (2013.01); *H01S 3/094053* (2013.01); *H01S 3/067* (2013.01)

(58) Field of Classification Search
  CPC .. H01S 3/0941; H01S 3/067; H01S 3/094019; H01S 3/094053
  See application file for complete search history.

(56) References Cited

U.S. PATENT DOCUMENTS

| | | | |
|---|---|---|---|
| 6,370,297 B1 * | 4/2002 | Hakimi | G02B 6/2852 359/341.1 |
| 7,978,943 B2 * | 7/2011 | Rockwell | G02B 6/2804 385/39 |
| 2002/0105997 A1 * | 8/2002 | Zhang | H01S 3/0941 372/70 |
| 2003/0063884 A1 * | 4/2003 | Smith | G02B 6/032 385/129 |

FOREIGN PATENT DOCUMENTS

| | | |
|---|---|---|
| JP | 2001-119084 A | 4/2001 |
| JP | 2009-129940 A | 6/2009 |
| JP | 2009-212184 A | 9/2009 |

* cited by examiner

OPTICAL FIBER DEVICE

PRIORITY

This is a National Stage Application under 35 U.S.C. § 365 of International Application PCT/JP2015/071115, with an international filing date of Jul. 24, 2015, which claims priority to Japanese Patent Application No. 2014-172809 filed on Aug. 27, 2014. The entire disclosures of International Application PCT/JP2015/071115 and Japanese Patent Application No. 2014-172809 are hereby incorporated herein by reference.

TECHNICAL FIELD

Certain implementations of the present invention relate to an optical fiber device.

BACKGROUND

Fibers (active fibers) to which laser active materials are added are used in laser oscillators and light amplifiers. For example, in laser oscillators and light amplifiers in which active fibers made of fluoride are used, in order to cause laser oscillation to occur, pump light is introduced into the fibers from an end surface of the fibers. When pump light is guided in an active fiber, the pump light is absorbed by a core portion to which a laser active material is added, and thus, output light is emitted. At this time, absorption of the pump light by the core causes heat generation in the core.

In particular, compared with commonly used quartz fibers, fluoride fibers have poor thermal resistance, and therefore, in the case of intense pump light, the fibers are deformed or damaged by the generated heat, and it becomes unable to cause laser oscillation and amplification to occur. For this reason, with a configuration in which pump light is introduced into a fiber from an end surface of the fiber, laser output is limited.

To address this issue, it is conceivable to use an optical coupler. A device may have a gain fiber and a pump light fiber connected to a side surface of the gain fiber. The pump light fiber guides pump light from a pumping source to the gain fiber. If a laser oscillator is configured by connecting a plurality of units in each of which a pump light fiber is connected to a side surface of a gain fiber as described above, pump light can be introduced from a plurality of portions. Thus, it is possible to increase the power of pump light that can be introduced, and hence increase the laser output while suppressing heat generation in the gain fiber.

SUMMARY

When an optical fiber is connected to a side surface of another optical fiber, there are cases where the vicinity of the joint portion may reach a high temperature due to leakage of light or scattering of light caused by irregular reflection at the interface of the joint portion.

As described above, especially the fluoride fibers have low thermal resistance, and therefore, if the vicinity of the joint portion reaches a high temperature, there is a risk that the fibers may be damaged.

An object of certain implementations of the present invention is that in an optical fiber device having a configuration in which an optical fiber is joined to a side surface of another optical fiber, a joint portion is suppressed from reaching a high temperature.

An optical fiber device according to an aspect of the present invention includes a first fiber, a second fiber, and a heat dissipation member. The first fiber guides light. The second fiber has a first end on or from which light is incident or output and a second end at which an end surface of the second fiber is obliquely joined to a side surface of the first fiber. The heat dissipation member is disposed so as to cover the entire circumference of a joint portion of the first fiber and the second fiber and has a thermal conductivity equal to or greater than that of the first and second fibers and a property of transmitting light that is guided by the first fiber and the second fiber.

When this device is used as an optical coupler, pump light from a pumping source is introduced into the first fiber through the second fiber. Connecting a plurality of units each constituted by the above-described first fiber and second fiber makes it possible to introduce pump light from a plurality of portions. Therefore, it is possible to obtain high-power laser light while suppressing heat generation due to introduction of the pump light.

Moreover, this device can also be used as a light distributor. In this case, light guided through the first fiber is distributed and output from the first end of the second fiber.

In the above-described configuration, the heat dissipation member is provided at the joint portion of the two fibers so as to cover the entire circumference of the joint portion. The heat dissipation member has favorable thermal conductivity and also has the property of transmitting the pump light. Thus, heat that is generated in the vicinity of the joint portion of the two fibers can be released, and furthermore, pump-light absorption and resulting heat generation by the heat dissipation member can be suppressed.

It should be noted that "has the property of transmitting the pump light" as used herein means cases where the pump-light absorptance is equal to or lower than 1%, and since the pump light is transmitted with almost no absorption, the heat dissipation member does not generate enough heat to cause damage to the fibers even if absorbing the pump light. For example, with respect to pump light having a wavelength of 0.3 to 4.0 $\mu$m, this can be realized by configuring the heat dissipation member using sapphire.

In the optical fiber device according to another aspect of the present invention, the first fiber has a core. Moreover, the optical fiber device further includes a third fiber that is connected to at least one end of the first fiber and that has a core to which a laser active material is added. Furthermore, pump light corresponding to the laser active material is caused to be incident on the second fiber.

Here, since the third fiber is connected to the first fiber, the pump light can be guided into the third fiber. Moreover, in this case, the core of the first fiber is not required to be doped with a laser active material, and thus, heat generation in the first fiber due to absorption of the pump light can be avoided.

In the optical fiber device according to still another aspect of the present invention, the heat dissipation member covers the joint portion of the first fiber and second fiber and a joint portion of the first fiber and the third fiber.

In a configuration in which the third fiber is joined to an end surface of the first fiber, there is a risk that heat generation may occur at the interface of the joint portion of these fibers, as in the case of the interface of the joint portion of the first fiber and the second fiber.

To address this issue, according to certain implementations of the present invention, the heat dissipation member that covers the joint portion of the first fiber and the second fiber is also configured to cover the joint portion of the first fiber and the third fiber. Thus, heat generated in these joint portions can be released by the single heat dissipation member.

In the optical fiber device according to yet another aspect of the present invention, the heat dissipation member has a first heat dissipation plate and a second heat dissipation plate that are arranged so as to sandwich the joint portion of the first fiber and the second fiber therebetween. In this case, it is easy to configure the heat dissipation member and to manufacture the optical fiber device as a whole.

In the optical fiber device according to yet another aspect of the present invention, the first fiber has a core, a first cladding that covers an outer circumferential surface of the core, and a second cladding that covers an outer circumferential surface of the first cladding, the second cladding having a lower refractive index than the first cladding.

Here, since the first fiber has the second cladding, scattering of the pump light from the surface of the fiber can be suppressed. Therefore, heat generation in the first fiber and resulting damage to the first fiber can be avoided.

In the optical fiber device according to yet another aspect of the present invention, the second fiber is joined to the side surface of the first fiber through fusing. Moreover, the second cladding of the first fiber is formed after the second fiber has been fused to the first fiber.

In the case of a double-clad structure in which the first fiber has the first cladding and the second cladding, the second cladding is generally formed of resin. Since resin cladding has poor thermal resistance, when the second fiber is to be joined to the first fiber by fusing the two fibers together, removal of the second cladding, which is made of resin, is required.

Thus, according to certain implementations of the present invention, after the two fibers are fused together, the second cladding that has been removed during fusing is formed again.

In the optical fiber device according to yet another aspect of the present invention, the second cladding is formed of an ultraviolet-curing resin or a thermosetting resin.

Here, after the two fibers are joined to each other, the second cladding can be formed through irradiation with ultraviolet rays via the heat dissipation member that allows light to pass through it, or through heating.

In the optical fiber device according to yet another aspect of the present invention, the first fiber has a core and a first cladding that covers an outer circumferential surface of the core, and pump light is caused to be incident on the second fiber. The heat dissipation member covers an outer circumferential surface of the first cladding, has a lower refractive index than the first cladding, and transmits the pump light.

Here, the first fiber is not provided with a pump-light reflecting layer (second cladding). However, the outer circumferential surface of the first cladding of the first fiber is covered by the heat dissipation member. The heat dissipation member has a lower refractive index than the first cladding, and therefore functions as a pump-light reflecting layer. Moreover, since the heat dissipation member transmits the pump light, absorption of the pump light by the heat dissipation member is suppressed, and thus, heat generation in the heat dissipation member can be suppressed.

In the optical fiber device according to yet another aspect of the present invention, the first fiber and the second fiber are fluoride fibers.

In the optical fiber device according to yet another aspect of the present invention, the first fiber and the second fiber are formed of ZBLAN glass.

According to certain implementations of the present invention described above, in an optical fiber device having a configuration in which an optical fiber is joined to a side surface of another optical fiber, a joint portion can be suppressed from reaching a high temperature.

DETAILED DESCRIPTION

First Embodiment

Figure 1:
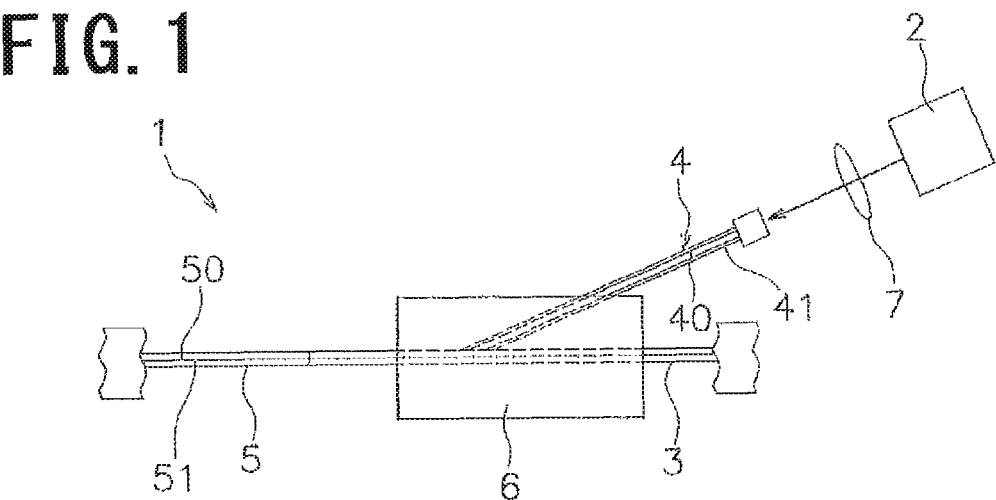
FIG. 1 is a configuration diagram of an optical fiber device according to an embodiment of the present invention.

FIG. 1 shows an optical fiber device according to a first embodiment of the present invention. An optical fiber device 1 is a single unit that constitutes a laser oscillator, and has a pumping source 2, a first fluoride fiber 3, a second fluoride fiber 4, a third fluoride fiber 5, and a heat dissipation member 6. A fiber laser oscillator can be configured by adding a reflecting mirror, an output mirror, and the like to the optical fiber device 1.

The pumping source 2 produces pump light having a wavelength capable of exciting a laser active material, and can be configured by a semiconductor laser, for example. The pump light produced by the pumping source 2 is introduced into the third fluoride fiber 5 via the second fluoride fiber 4 and the first fluoride fiber 3.

Figure 2:
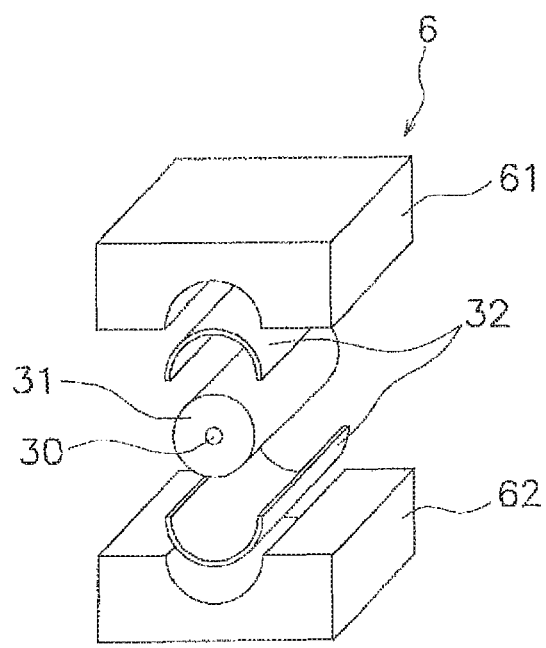
FIG. 2 is an enlarged exploded view showing a joint portion in FIG. 1.

The first fluoride fiber 3 is a double-clad fiber, and has, as shown FIG. 2, a core 30, a first cladding 31, and a second cladding 32. FIG. 2 shows a portion of the heat dissipation member 6 and the first fluoride fiber 3 in an exploded manner. The first cladding 31 is formed so as to cover an outer circumferential surface of the core 30. The second cladding 32 is formed so as to cover an outer circumferential surface of the first cladding 31.

The core 30 of the first fluoride fiber 3 is formed of a fluoride glass that is not doped with a laser active material, and is preferably formed of a ZBLAN ($ZrF_4$—$BaF_2$—$LaF_3$—$AlF_3$—$NaF$) glass. Since the core 30 is not doped with a laser active material, no laser light is generated in the core 30; however, heat generation due to absorption of the pump light can be avoided. The first cladding 31 is formed of a fluoride glass and is preferably formed of a ZBLAN glass. The second cladding 32 is formed of an ultraviolet-curing resin or a thermosetting resin. The first cladding 31 has a lower refractive index than the core 30, and the second cladding 32 has a lower refractive index than the first cladding 31. Moreover, the first cladding 31 and the second cladding 32 are not doped with a laser active material.

The second fluoride fiber 4 is a multimode fiber and has, as shown in FIG. 1, a core 40 that has a large diameter and a reflective cladding layer 41 that is formed so as to cover an outer circumferential surface of the core 40. The core 40 and the reflective cladding layer 41 are each formed of a fluoride glass and preferably formed of a ZBLAN glass. The reflective cladding layer 41 has a lower refractive index than the core 40. Moreover, the refractive index of the core 40 is preferably equal to or lower than the refractive index of the first cladding 31 of the first fluoride fiber 3 and is more preferably equal to the refractive index of the first cladding of the first fluoride fiber 3.

The pump light from the pumping source 2 is caused to be incident on one end of the second fluoride fiber 4 via a lens 7. Moreover, a leading end (end portion on the side that is connected to a side surface of the first fluoride fiber 3) of the second fluoride fiber 4 is obliquely polished so as to have a predetermined angle. It should be noted that a method for joining the second fluoride fiber 4 to the side surface of the first fluoride fiber 3 will be described later.

The third fluoride fiber 5 is fusion-spliced to one end surface of the first fluoride fiber 3. The third fluoride fiber 5 is a double-clad fiber, and has, as in the case of the first fluoride fiber 3, a core 50, a first cladding 51, and a second cladding (not shown). The third fluoride fiber 5 differs from the first fluoride fiber 3 only in the specific configuration of the core 50. That is to say, the core 50 of the third fluoride fiber 5 is composed of a fluoride glass, and this fluoride glass is doped with a rare-earth element serving as a laser active material. Specifically, the core 50 is formed of a ZBLAN glass doped with erbium.

Figure 3:
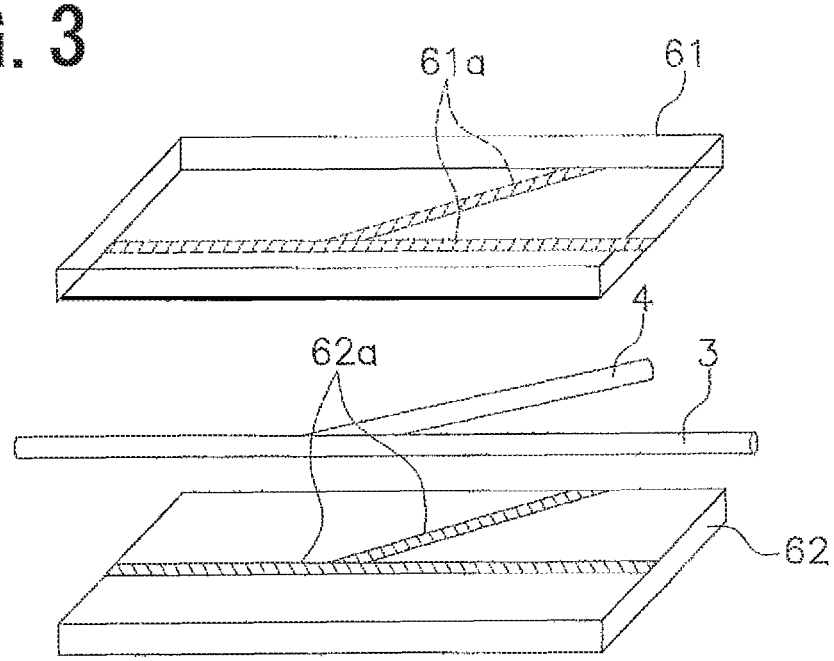
FIG. 3 is an exploded view showing a heat dissipation member and a fiber joint portion.

As shown in FIGS. 2 and 3, the heat dissipation member 6 has a first heat dissipation plate 61 and a second heat dissipation plate 62. The first and second heat dissipation plates 61 and 62 have the same configuration. That is to say, the first and second heat dissipation plates 61 and 62 are formed of sapphire having a rectangular shape, which has favorable pyroconductivity and has the property of transmitting light. Semicircular grooves 61a and 62a in which the first fluoride fiber 3, the second fluoride fiber 4, and a joint portion of these two fibers can be accommodated are formed in the respective heat dissipation plates 61 and 62. A portion of the first and second fluoride fibers 3 and 4 that contains the joint portion is sandwiched by the two heat dissipation plates 61 and 62, and the entire circumference of the joint portion of the two fibers 3 and 4 as well as the surroundings of the joint portion are covered by the first and second heat dissipation plates 61 and 62.

It should be noted that, although not shown in the drawings, both or either one of the first and second heat dissipation plates 61 and 62 is provided with a heat sink in contact therewith.

In the optical fiber device 1 having the above-described configuration, the pump light from the pumping source 2 is caused to be incident on the second fluoride fiber 4 through the lens 7. The second fluoride fiber 4 can guide the pump light in the core 40 and introduce the pump light into the first cladding 31 of the first fluoride fiber 3 via the joint portion. At this time, reflection of the pump light at the interface between the core 40 and the first cladding 31 can be suppressed by setting the refractive index of the core 40 equal to or lower than the refractive index of the first cladding 31 of the first fluoride fiber 3.

The first fluoride fiber 3 and the third fluoride fiber 5 guide the pump light in the respective first claddings 31 and 51. In the third fluoride fiber 5, the pump light excites the laser active material of the core 50 while being guided through the first cladding 51, and thus, laser light is emitted from the laser active material. In the case where erbium is used as the laser active material, and pump light having a wavelength of 975 nm is introduced, laser light having a wavelength of about 2.8 μm is obtained. The laser light emitted from the laser active material is guided in the core 50 of the third fluoride fiber 5 and the core 30 of the first fluoride fiber 3.

Joining Method

A description of a method for joining the second fluoride fiber 4 to the side surface of the first fluoride fiber 3 is given below.

First, the second cladding 32 is removed from a portion of the first fluoride fiber 3 that contains the joint portion. The reason for this is that the second cladding 32, which is made of resin, has poor thermal resistance and will therefore be damaged during fusing. Meanwhile, a leading end surface of the second fluoride fiber 4 is obliquely polished. At this time, if a protective resin layer is formed on the surface of the second fluoride fiber 4, the resin layer is removed from a leading end portion that is to be joined to the first fluoride fiber 3. Then, the leading end of the second fluoride fiber 4 is pressed against a side surface of the first fluoride fiber 3, and the two fibers are fused together through irradiation with laser light, for example.

After the first fluoride fiber 3 and the second fluoride fiber 4 are fused together in the above-described manner, the second cladding 32 made of resin is formed again on the portion of the first fluoride fiber 3 from which the second cladding 32 has been removed.

The second cladding 32 is formed of an ultraviolet-curing resin or a thermosetting resin. In the case of the ultraviolet-curing resin, in a state in which the ultraviolet-curing resin is applied to the grooves 61a and 62a of the first and second heat dissipation plates 61 and 62 or portions of the first and second fluoride fibers 3 and 4 that are to be covered by the two heat dissipation plates 61 and 62, the first and second fluoride fibers 3 and 4 are sandwiched between the two heat dissipation plates 61 and 62, then, the resin is cured through irradiation with ultraviolet rays from the outside of transparent sapphire (through the heat dissipation member 6), and thus the second cladding can be formed on the first fluoride fiber 3. On the other hand, in the case of the thermosetting resin, the resin is cured through heating via the heat dissipation member 6 having favorable thermal conductivity, and thus the second cladding can be formed on the first fluoride fiber 3.

When the second fluoride fiber 4 has been fused to the first fluoride fiber 3 in the above-described manner, and the second cladding 32 made of resin has been formed on the first fluoride fiber 3, scattering of the pump light occurs due to a defect in the fused portion or peeling or the like of the resin caused by deterioration over time, resulting in heat generation. However, since the joint portion is covered by the heat dissipation member 6, it is possible to suppress the joint portion from reaching a high temperature. Moreover, the joint portion of the first fluoride fiber 3 and the second fluoride fiber 4 is reinforced by the heat dissipation member 6.

Figure 4:
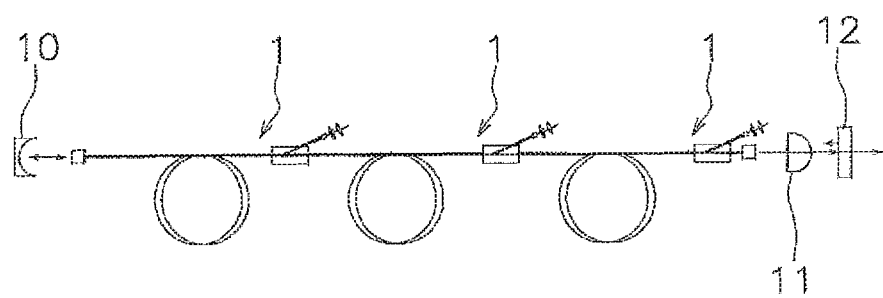
FIG. 4 shows a configuration of a laser oscillator that is obtained by connecting devices that are the same as the optical fiber device shown in FIG. 1.

A laser oscillator can be configured by connecting in series a plurality of optical fiber devices 1 that are obtained in the above-described manner and disposing a reflecting mirror 10 on one end side and a lens 11 and an output mirror 12 on the other end side as shown in FIG. 4. Here, pump light can be introduced from a plurality of portions other than end surfaces of the fibers, and therefore, it is possible to obtain a high-power laser oscillator within a range in which the ZBLAN fibers are not thermally damaged.

Second Embodiment

In the first embodiment, the second cladding 32, which is made of resin, of the first fluoride fiber 3 is removed from the joint portion, and after joining, the second cladding is formed again. However, in the second embodiment, after the first fluoride fiber 3 and the second fluoride fiber 4 are joined to each other, the second cladding is not formed on a portion of the first fluoride fiber 3 that is covered by the first and second heat dissipation plates.

If the second cladding 32 of the first fluoride fiber 3 is removed, the pump light leaks to the outside from the first fluoride fiber 3, and accordingly, the pump light introduction efficiency decreases. Moreover, if the leaking pump light is radiated onto surrounding members, dust, and the like, heat is generated.

To address this issue, in the case where the second cladding is not formed after joining of the two fluoride fibers 3 and 4, it is necessary to cover the joint portion from which the second cladding has been removed and its surroundings with a member having a lower refractive index than the first cladding 31 so as to prevent leakage of the pump light to the outside.

In order to realize this, in the second embodiment, the first and second heat dissipation plates are formed by using a $CaF_2$ substrate having a lower refractive index than ZBLAN. Here, the two heat dissipation plates function as the second cladding of the first fluoride fiber and can cause the pump light to be guided in the fiber. Moreover, since the first and second heat dissipation plates are formed of a member that has the property of transmitting the pump light, even if scattered light of the pump light is emitted to the outside of the fiber, the two heat dissipation plates do not absorb the scattered light, and thus heat generation can be avoided. $CaF_2$ can transmit light over a wider wavelength range than ZBLAN, and therefore has the property of transmitting light that can be guided by ZBLAN fibers. Furthermore, since a $CaF_2$ substrate has greater thermal conductivity than ZBLAN and resin cladding, effective cooling is achievable by mounting a heat sink to the $CaF_2$ substrate.

It should be noted that in the second embodiment, heat dissipation efficiency can be increased even more by fusing the first fluoride fiber 3 and the heat dissipation member together and thereby joining them with no gap therebetween. In this case, in a state in which the first cladding 31 of the first fluoride fiber 3 is sandwiched by the first heat dissipation plate and the second heat dissipation plate, the first cladding 31 of the first fluoride fiber 3 is heated. In this manner, the first fluoride fiber 3 and the first and second heat dissipation plates can be fused together. For example, the first cladding 31 of the first fluoride fiber 3 is heated via the heat dissipation member by using a heater, laser irradiation, or the like. At this time, the heating temperature is preferably set to be equal to or higher than the softening point of the first cladding 31 of the first fluoride fiber 3 and is preferably set to be lower than the crystallization onset temperature thereof. Moreover, simultaneously with fusing the first fluoride fiber 3 and the heat dissipation member together, a portion of the second fluoride fiber 4 that is to be covered by the first heat dissipation plate and the second heat dissipation plate may also be fused to the heat dissipation member.

It should be noted that the first and second heat dissipation plates of the second embodiment differ from those of the first embodiment only in the material, and are otherwise the same as those of the first embodiment.

According to the second embodiment as well, the same effects as those of the first embodiment can be obtained.

Other Embodiments

Implementations of the present invention are not limited to the foregoing embodiments, and various modifications or alterations can be made thereto without departing from the scope of the present invention.

(a) In the first embodiment, the heat dissipation member is formed of sapphire. However, the material for the heat dissipation member is not limited to sapphire. Any material that has a thermal conductivity equal to or greater than that of the fibers and the property of transmitting pump light can be used as the heat dissipation member.

(b) In the second embodiment, the first and second heat dissipation plates are formed of a $CaF_2$ substrate having a low refractive index in order to prevent leakage of pump light to the outside. However, the configuration for preventing leakage of the pump light to the outside is not limited to this. For example, the side surface of the fiber may be coated with a reflective layer.

(c) In the foregoing embodiments, a ZBLAN fiber that is not doped with a laser active material is used as the first fluoride fiber. However, a ZBLAN fiber doped with a laser active material may also be used. In this case, the third fluoride fiber is no longer required.

Moreover, in the case where a fiber doped with a laser active material is used as both the first fluoride fiber and the third fluoride fiber, fusing the two fibers is no longer required.

Figure 5:
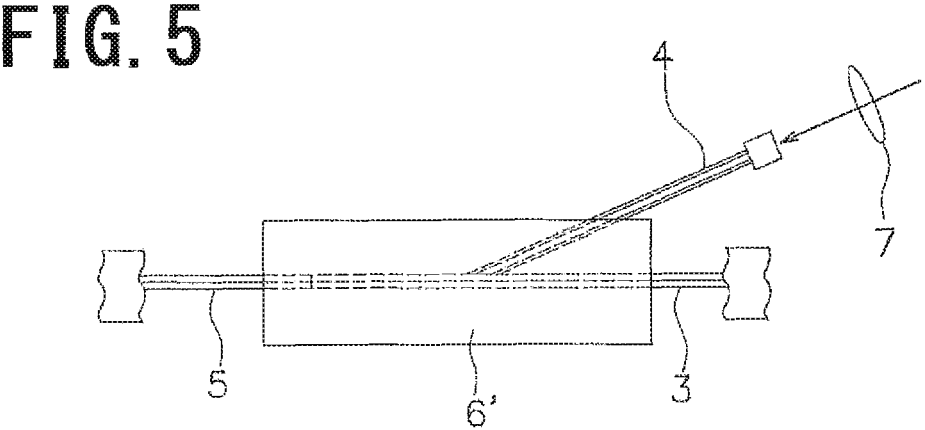
FIG. 5 shows a joint portion according to another embodiment.

(d) The heat dissipation member may also be formed so as to cover not only the joint portion of the first fluoride fiber 3 and the second fluoride fiber 4 but also a joint portion of the first fluoride fiber 3 and the third fluoride fiber 5 like a heat dissipation member 6' shown in FIG. 5. In this case, heat generated in the two joint portions can be released by one heat dissipation member 6'.

(e) In the foregoing embodiments, the present invention may be used as a laser oscillator. However, the present invention is also applicable to other devices.

(f) In the foregoing embodiments, a second fluoride fiber having a core may be used as the second fiber of the present invention. However, a second fluoride fiber having no core may also be used as the second fiber.

(g) Certain implementations of the present invention can also be used as a light distributor that distributes light that is guided through the first and third fluoride fibers into the second fluoride fiber and outputs the light therefrom.

(h) The foregoing embodiments have been described using a fiber having a circular cross-sectional shape as an example. However, a fiber having a rectangular cross-sectional shape may also be used. In this case, it is easy to join the second fiber to the first fiber.

(i) The foregoing embodiments have been described using erbium as the laser active material. However, other laser active materials such as thulium and holmium may also be used. Depending on the combination of the laser active material and the wavelength of the pump light, laser light having various wavelengths can be produced.

(j) In the foregoing embodiments, the first fluoride fiber 3 and the second fluoride fiber 4 are joined to each other by fusing the two fibers together. However, these fibers may also be joined to each other by using other methods, such as an adhesive.

INDUSTRIAL APPLICABILITY

According to an optical fiber device of an implementation of the present invention, in a device having a configuration in which an optical fiber is joined to a side surface of another optical fiber, it is possible to suppress a joint portion from reaching a high temperature.

The invention claimed is:

1. An optical fiber device comprising:
   a first fiber configured to guide light;
   a second fiber having a first end on or from which light is incident or output and a second end at which an end surface of the second fiber is obliquely joined to a side surface of the first fiber; and
   a heat dissipation member that is disposed so as to cover an entire circumference of a joint portion of the first fiber and the second fiber and that has a thermal conductivity equal to or greater than that of the first and second fibers and a property of transmitting the light that is guided by the first fiber and the second fiber.

2. The optical fiber device according to claim 1,
   wherein the first fiber has a core,
   the optical fiber device further comprises a third fiber that is connected to at least one end of the first fiber and has a core to which a laser active material is added, and
   pump light corresponding to the laser active material is caused to be incident on the second fiber.

3. The optical fiber device according to claim 2,
   wherein the heat dissipation member covers the joint portion of the first fiber and the second fiber and a joint portion of the first fiber and the third fiber.

4. The optical fiber device according to claim 1,
   wherein the heat dissipation member has a first heat dissipation plate and a second heat dissipation plate that are arranged in such a manner as to sandwich the joint portion of the first fiber and the second fiber therebetween.

5. The optical fiber device according to claim 1,
   wherein the first fiber has a core, a first cladding that covers an outer circumferential surface of the core, and a second cladding that covers an outer circumferential surface of the first cladding, the second cladding having a lower refractive index than the first cladding.

6. The optical fiber device according to claim 5,
   wherein the second fiber is joined to the side surface of the first fiber through fusing, and
   the second cladding of the first fiber is formed after the second fiber has been fused to the first fiber.

7. The optical fiber device according to claim 6,
   wherein the second cladding is formed of an ultraviolet-curing resin or a thermosetting resin.

8. The optical fiber device according to claim 1,
   wherein the first fiber has a core and a first cladding that covers an outer circumferential surface of the core,
   pump light is caused to be incident on the second fiber, and
   the heat dissipation member covers an outer circumferential surface of the first cladding, has a lower refractive index than the first cladding, and transmits the pump light.

9. The optical fiber device according to claim 1,
   wherein the first fiber and the second fiber are fluoride fibers.

10. The optical fiber device according to claim 9,
    wherein the first fiber and the second fiber are formed of ZBLAN glass.

* * * * *